(12) United States Patent
Wong et al.

(10) Patent No.: US 7,707,735 B2
(45) Date of Patent: May 4, 2010

(54) HOLE ANGULARITY GAGE AND METHODS OF OPERATION AND MANUFACTURE THEREFOR

(75) Inventors: Kin Y. Wong, Renton, WA (US); Lewis J. Sprague, Auburn, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 11/763,143

(22) Filed: Jun. 14, 2007

(65) Prior Publication Data

US 2008/0307664 A1    Dec. 18, 2008

(51) Int. Cl.
   *G01B 3/56*    (2006.01)
(52) U.S. Cl. .............................. 33/534; 33/533; 33/542
(58) Field of Classification Search ................. 33/534, 33/529, 533, 1 N, 412, 538, 661, 645
   See application file for complete search history.

(56) References Cited

U.S. PATENT DOCUMENTS

| | | | | | |
|---|---|---|---|---|---|
| 4,219,936 | A | * | 9/1980 | Bridges | 33/534 |
| 4,486,954 | A | * | 12/1984 | Mock | 33/534 |
| 4,625,427 | A | | 12/1986 | Rine et al. | |
| 4,772,849 | A | * | 9/1988 | Tedder | 33/544.1 |
| 4,897,928 | A | * | 2/1990 | Maxville et al. | 33/534 |
| 4,905,378 | A | * | 3/1990 | Culver et al. | 33/836 |
| 5,168,638 | A | * | 12/1992 | Barton | 33/644 |
| 5,251,381 | A | * | 10/1993 | Turner et al. | 33/538 |
| 5,392,526 | A | | 2/1995 | Sprague et al. | |
| 5,777,562 | A | * | 7/1998 | Hoffman | 33/520 |
| 5,852,642 | A | * | 12/1998 | Descot et al. | 33/533 |
| 6,813,843 | B1 | * | 11/2004 | Faubion | 33/638 |
| 7,493,703 | B2 | * | 2/2009 | Kim et al. | 33/512 |

OTHER PUBLICATIONS

Perpendicularity Gage With Close Fitted Quick Connecting Probes, Trulok PG900-2-1, http://www.trulok.com/products/PERPENDICULARITY/20.html.
UK IP office Search Report for application GB0810811.0 dated Oct. 2008.

* cited by examiner

*Primary Examiner*—Yaritza Guadalupe-McCall
(74) *Attorney, Agent, or Firm*—Yee & Associates, P.C.; Dennis R. Plank (57) ABSTRACT

An embodiment of a hole angularity gage includes a gage body and a contact disc positioned within the gage body. The contact disc includes a central opening defined by an inner edge. The gage also includes a center pin that extends through the central opening, and a hole probe adapted to rotate the center pin from a primary gage axis toward the contact disc's inner edge. The gage also includes an indicator adapted to activate when the center pin makes contact with the contact disc. Another embodiment of a hole angularity gage includes a hole probe and a circuit. The circuit includes an indicator and a switch, which is adapted to close when the hole probe is rotated by an angle greater than a gage setting angle. The indicator is adapted to activate when the switch is closed. Other embodiments include methods for using and manufacturing hole angularity gages.

19 Claims, 9 Drawing Sheets

HOLE ANGULARITY GAGE AND METHODS OF OPERATION AND MANUFACTURE THEREFOR

TECHNICAL FIELD

Embodiments described herein generally relate to hole angularity gages and methods of operation therefore, and more particularly to hole angularity gages.

BACKGROUND

Many types of structures include holes drilled or formed through a surface of a system component (e.g., the skin of an aircraft fuselage or wing). For example, surface holes may be used to accept rivets or other mechanical fasteners, so that a first component may be connected to a second component. In some cases, stringent requirements are specified regarding the perpendicularity of the holes, with respect to the surface of the component. For example, a requirement may specify that a hole angle (e.g., the angle of the hole sidewall, with respect to the surface) may be no more than ±2 degrees off perpendicular. When a hole is more than ±2 degrees off perpendicular, the hole may be considered to be out of tolerance.

A perpendicularity (or angularity) gage may be used to determine whether or not a hole is out of tolerance. One type of perpendicularity gage includes a digital indicator or an analog meter connected to a gage body. The gage body is adapted to accept any one of a plurality of hole probes of various diameters. To measure the perpendicularity of a hole having a particular diameter, an inspector may select a hole probe having a corresponding diameter, and may attach the selected hole probe to the gage body. The inspector may then insert the hole probe into the hole. The digital indicator may indicate the hole angle as a decimal degree reading, or alternatively, the analog meter may include a pointer, which points to the approximate hole angle along a scale. Based on the reading, the inspector may determine whether or not the hole is out of tolerance.

Although existing perpendicularity gages provide adequate functionality in many cases, they also suffer from some disadvantages. For example, when using a perpendicularity gage that includes an analog meter, the inspector may take a certain amount of time to read and interpret the pointer location on the meter to determine whether or not the hole is out of tolerance. When numerous holes are to be tested, this process may result in a lengthy inspection time. Dim ambient lighting also may affect the ability of the inspector to read the analog meter accurately and rapidly. In addition, existing perpendicularity gages may have dimensions that preclude them from being used in certain situations. For example, the analog and digital types of perpendicularity gage described above typically have gage body diameters that are substantially larger than the diameter of the hole probes. Accordingly, these perpendicularity gages can not be used to measure holes that are very close to vertical obstructions. In addition, the digital indicator adds significant height and weight to the gage, making it impractical for measuring holes located under low ceiling obstructions. Another disadvantage stems from the necessity for a hole probe for every diameter of hole to be measured. More specifically, it may be inconvenient to keep track of and change out the hole probes when measuring holes having only slight diameter variations. When a hole probe of a specific diameter is not available (e.g., it has been misplaced), the gage may be rendered unusable.

For at least these reasons, it is desirable to provide hole angularity gages which facilitate rapid out-of-tolerance decisions, which have dimensions rendering them usable in areas with close vertical or ceiling obstructions, and/or which reduce the inconvenience of having multiple hole probes. Other desirable features and characteristics of embodiments of the inventive subject matter will become apparent from the subsequent detailed description and the appended claims, taken in conjunction with the accompanying drawings and the foregoing technical field and background.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background or the following detailed description.

Embodiments of the inventive subject matter include hole angularity gages, which may be referred to herein simply as "gages." A "hole," as that term is used herein, means an aperture in a surface, where the aperture is defined by at least one sidewall. A hole may be substantially circular, in which case the hole may be defined by a single, curved sidewall, or a hole may have another shape. A "surface-perpendicular axis," as that term is used herein, means an axis that is substantially perpendicular to the surface within which a hole is formed. A "hole axis," as that term is used herein, means an axis that is substantially parallel to a hole sidewall, and that extends substantially through a center of the hole along the hole's length. When a sidewall of a hole is precisely perpendicular to the surface, the surface-perpendicular axis and the hole axis will be coincident. However, when a sidewall of a hole is not precisely perpendicular to the surface, an angular offset will exist between the surface-perpendicular axis and the hole axis. This angular offset is referred to herein as a "hole angle." A hole angularity gage, in accordance with an embodiment, is adapted to be partially inserted into a hole, and to produce an indication when a hole angle is equal to or greater than a "gage setting angle."

In the description of the FIGs, certain terms may be used in describing embodiments of various components of gages. For example, as used herein, when referring to a particular end of a gage component, the term "distal end" means an end that is oriented toward an insertion end of a gage (e.g., gage insertion end 104, FIG. 1), and the term "proximal end" means another end that is oriented toward an indicator end of a gage (e.g., gage indicator end 106, FIG. 1). Similarly, the term "distal surface" means a surface that is oriented toward the hole insertion end, and the term "proximal surface" means another surface that is oriented toward the indicator end. The term "surface" may mean a surface that is substantially flat, curved or irregular. In other words, a "surface" may include one or more features or levels, which deviate from a continuous flat surface, and/or a "surface" may include one or more curves or contours. As used herein, the term "coupled to" may indicate a direct or indirect physical coupling between components. The term "electrically coupled to" may indicate a direct or indirect electrical connection between conductive components. The term "connected to" may indicate a direct connection between components.

Figure 1:
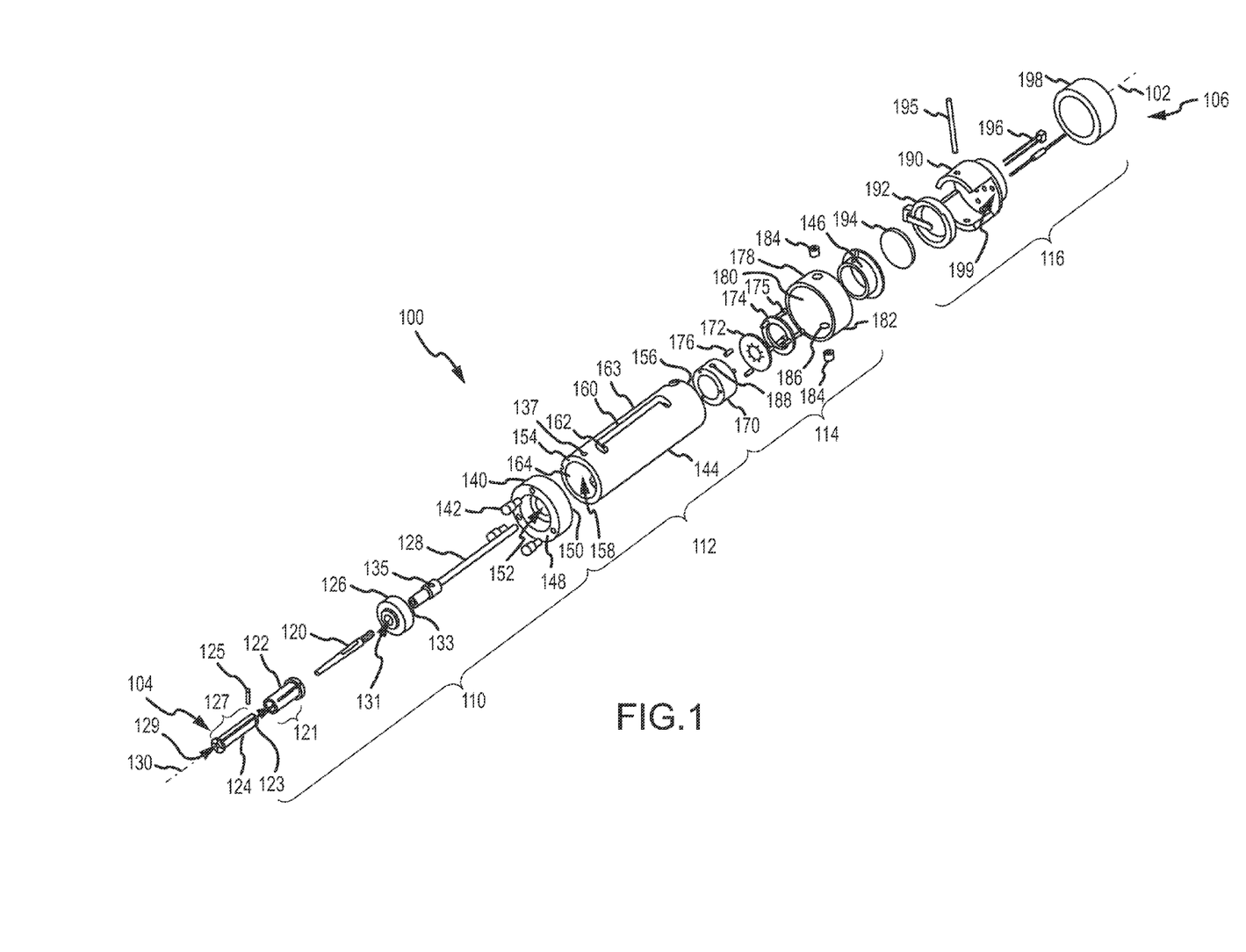
FIG. 1 illustrates an exploded view of a hole angularity gage, in accordance with an example embodiment of the inventive subject matter.

FIG. 1 illustrates an exploded view of a hole angularity gage 100, in accordance with an example embodiment of the inventive subject matter. The various components of gage 100 are oriented along a first axis 102, referred to herein as a "primary gage axis." Primary gage axis 102 extends between a gage insertion end 104 and a gage indicator end 106. Gage 100 is described herein as including four subassemblies, which include a hole probe and center pin subassembly 110, a gage body subassembly 112, a contact disc subassembly 114, and an indicator subassembly 116.

Hole probe and center pin subassembly 110 includes a tapered pin 120, an outer collet 122, an inner collet 124, a retaining pin 125, a spherical ball bearing 126, and a center pin 128, in an embodiment. In an embodiment, tapered pin 120, outer collet 122, inner collet 124, retaining pin 125, bearing 126, and center pin 128 are assembled together so that they remain substantially fixed, relative to each other along a second axis 130, which is referred to herein as a "center pin axis." The center pin axis 130 may rotate, with respect to the primary gage axis 102, about a point that is approximately coincident with the center of bearing 126. This point is referred to herein as the "center of rotation" in bearing 126. When gage 100 is properly calibrated and inserted into a 0 degree hole, the center pin axis 130 and the primary gage axis 102 are substantially coincident, as is illustrated in FIG. 1. However, as will be described in more detail later, when outer collet 122 is inserted into a non-perpendicular hole, the center pin axis 130 may be rotated from the primary gage axis 102, such that an offset angle exists between the two axes 102, 130. The center of bearing 126 remains an intersection point for the center pin axis 130 and the primary gage axis 102, as will be illustrated and described in conjunction with FIGS. 4 and 5. The offset angle between the center pin axis 130 and the primary gage axis 102 corresponds to the hole angle (e.g., offset angle 404, 490, FIGS. 4, 5), which was briefly described above. As will also be described in more detail later, when the offset angle is equal to or greater than a gage setting angle, gage 100 may produce an indication to a gage user.

Tapered pin 120, outer collet 122, inner collet 124, and retaining pin 125 together form a hole probe. Outer collet 122 includes a shaft portion 121 having an outer collet central channel 123, which is adapted to accept the proximal end of inner collet 124 at the distal end of shaft portion 121. Inner collet 124 includes a shaft portion 127 having an inner collet central channel 129, which is adapted to accept the distal end of tapered pin 120 at the proximal end of shaft portion 127. Outer collet 122 and inner collet 124 each include one or more slots, grooves or other features along shaft portions 121 and 127, respectively, which enable shaft portions 121 and 127 to expand and contract, in diameter, when tapered pin 120 is advanced into and retracted out of the inner collet central channel 129, respectively. Outer collet 122 and inner collet 124 are formed from one or more substantially rigid materials, which repeatedly may be deflected (e.g., to increase the diameters of shaft portions 121 and 127) and returned to their original position. For example, but not by way of limitation, outer collet 122 and/or inner collet 124 may be formed from one or more materials selected from a group of materials that include aluminum-nickel-bronze, bronze, brass, copper, and/or alloys thereof, although outer collet 122 and/or inner collet 124 alternatively may be formed from one or more other types of materials. As will be explained in more detail later, when the hole probe is inserted into a hole, the diameters of shaft portions 121 and 127 automatically expand until the outer diameter of outer collet 122 approximately equals the hole diameter. This is accomplished through automatic advancement and retraction of tapered pin 120 into and out of the inner collet central channel 129, as will be discussed in more detail in conjunction with FIGS. 2, 6, and 7.

In an alternate embodiment, a hole probe may be formed from a single collet and tapered pin subassembly, where the collet includes a shaft portion having a collet central channel, which is adapted to accept the proximal end of the tapered pin at the distal end of the shaft portion. In such an embodiment, the tapered pin may be manipulated to adjust a diameter of the collet within a range of diameters. More specifically, a diameter of the collet may be increased or reduced, in an embodiment, by advancing or retracting the tapered pin further into or out of, respectively, the collet central channel. The tapered pin may include threads along its length, and a screwdriver tip acceptor proximate to the distal end. The threads and screwdriver tip acceptor may enable the tapered pin to be advanced or retracted, with respect to the collet, thus expanding or reducing the diameter of the collet, respectively. In still another embodiment, a hole probe may be one of a plurality of interchangeable hole probes, where each of the interchangeable hole probes is adapted to expand and contract within a different range of diameters.

Bearing 126 includes a central channel 131, which is adapted to accept a distal end of center pin 128. The distal end of center pin 128 includes a hole 133, which is adapted to accept a proximal end of tapered pin 120. In an embodiment, the proximal end of tapered pin 120 includes a threaded portion (e.g., threaded portion 618, FIG. 6), which may be screwed into hole 133, and sidewalls of hole 133 include complementary threads. Accordingly, after a gage is fully assembled, a hole probe may be installed by screwing the proximal end of tapered pin 120 into the hole 133 of center pin 128, and the hole probe may be removed by unscrewing the proximal end of tapered pin 120 from hole 133. In an embodiment, the hole probe and center pin subassembly 110 may freely rotate around the center pin axis 130 when it is assembled with bearing 126. To provide the ability to restrict this free rotation during the process of installing (e.g., screwing in) or uninstalling (e.g., unscrewing) a hole probe, complementary holes 135, 137 are located in center pin 128 and gage body 144, respectively. A gage user desiring to install or uninstall a hole probe may slide an elongated object (e.g., a screwdriver) into the gage body hole 137, and then may rotate the hole probe and center pin subassembly 110 around the center pin axis 130 until the elongated object can be inserted into the corresponding center pin hole 135. This restricts the hole probe and center pin subassembly 110 from rotating while the gage user screws or unscrews the hole probe from the center pin 128.

Gage body subassembly 112 includes a bearing holder 140, a plurality of surface contact members 142, a gage body 144, and a body top 146 (shown separated from the rest of gage body subassembly 112, in FIG. 1). Gage body subassembly 112 is coupled to the hole probe and center pin subassembly 110. More particularly, when gage 100 is assembled, bearing 126 is held in place by bearing holder 140, and center pin 128 extends into gage body 144.

Bearing holder 140 may include a structure defined by a distal surface 148, a proximal surface 150, a substantially circular cross-sectional area, and a central opening 152 defined by at least one sidewall extending between the distal surface 148 and the proximal surface 150. Surface contact members 142 may be coupled to the distal surface 148 of bearing holder 140, in an embodiment. Surface contact members 142 are adapted to provide points of contact with a surface, when collet 122 is inserted into a hole in the surface. For example, gage 100 may include three surface contact members 142, which may provide up to three points of contact with a surface. In other embodiments, gage 100 may include more than three surface contact members. In still other embodiments, gage 100 may not include surface contact members 142, and contact with a surface may instead be provided by the distal surface 148 of bearing holder 140.

Gage body 144 may include a substantially tubular structure defined by a distal end 154, a proximal end 156, and a central channel 158 extending between the distal end 154 and the proximal end 156. In addition, gage body 144 may include one or more elongated apertures 160 that extend through and between an outer surface 163 and inner surface 164 of gage body 144. In a particular embodiment, gage body 144 includes two elongated apertures 160 on opposite sides of gage body 144. Each elongated aperture 160 includes a first end oriented toward the distal end 154 and a second end oriented toward the proximal end 156 of the gage body 144. Each elongated aperture 160 also may include one or more indentations 162, in an embodiment, the function of which will be described in more detail later. Although two indentations 162 are illustrated in FIG. 1, an elongated aperture 160 may include more or fewer than two indentations 162, in other embodiments.

The distal end 154 of gage body 144 may be coupled to the proximal surface 150 of bearing holder 140, in an embodiment. In a particular embodiment, the proximal surface 150 of bearing holder 140 may include a notch or groove, which is adapted to accept the distal end 154 of gage body 144. Body top 146 may be adapted to be inserted into the proximal end 156 of gage body 144.

Contact disc subassembly 114 may include an inner ring 170 and a contact disc 172, which may be held together with an assembly ring 174, screws 175, and springs 176. When assembled, springs 176 are disposed between contact disc 172 and inner ring 170, and screws 175 extend through holes in assembly ring 174 and contact disc 172, through the centers of screws 175, and into screw holes in inner ring 170. In an embodiment, screws 175 and springs 176 enable the contact disc subassembly to be calibrated, during manufacture, so that contact disc 172 is substantially concentric and positioned at the correct height, relative to the center of rotation in bearing 126. In an embodiment, inner ring 170, contact disc 172 and assembly ring 174 have diameters that are smaller than a diameter of the central channel 158 of gage body 144. Accordingly, inner ring 170, contact disc 172 and assembly ring 174 may be slid into central channel 158.

Contact disc subassembly 114 also includes a sliding member 178, which is coupled through the elongated aperture 160 to the contact disc subassembly 114. Sliding member 178 is adapted to slide contact disc 172 within the central channel 158 as the sliding member 178 is slid up and down the length of gage body 144. In an embodiment, sliding member 178 may include a substantially tubular structure (e.g., an outer ring or a substantially circular band) having an inner surface 180 and an outer surface 182. A diameter of inner surface 180 may be slightly wider than a diameter of the outer surface 163 of gage body 144. Accordingly, sliding member 178 may be fitted over gage body 144 so that sliding member 178 may be slid up and down a length of gage body 144. In other embodiments, sliding member 178 may include another type of structure, such as a semi-circular band or a knob, for example but not by way of limitation.

In an embodiment, sliding member 178 is coupled to inner ring 170, using one or more connectors 184, which extend through holes 186 in sliding member 178, through elongated apertures 160, and into complementary acceptors 188 in inner ring 170. In another embodiment, sliding member 178 is directly coupled to inner ring 170. Either way, when sliding member 178 is slid up and down the length of gage body 144, the inner ring 170 and contact disc 172 correspondingly slide up and down within the central channel 158 of gage body 144. In other words, inner ring 170, contact disc 172 and sliding member 178 are slidably coupled to gage body 144. As will be described in more detail later, this enables gage 100 to be set to a range of gage setting angles and/or to indicate a range of hole angles.

Indicator subassembly 116 includes an indicator housing 190, a battery holder 192, a battery 194, a lock pin 195, an indicator 196 (e.g., an indicator, such as an LED), and a cover 198, in an embodiment. Indicator housing 190 includes a distal opening 199 adapted to house battery holder 192. Battery holder 192 is adapted to accept a button-type battery for providing current to indicator 196, in an embodiment. Battery 194 may be held in place by a spring arm of battery holder 192. Lock pin 195 is adapted to connect indicator housing 190 with gage body 144 by inserting lock pin 195 through complementary holes on both sides of indicator housing 190 and gage body 144, when those holes are aligned. Indicator 196 may be, for example, a light emitting diode (LED) or another type of light. Indicator 196 may be assembled on a proximal side of indicator housing 190. Cover 198 may be formed from a transparent or semi-transparent material, and may be assembled onto indicator housing 190 over indicator 196. Indicator subassembly 116 is coupled to a proximal end of gage body 144, in an embodiment. More particularly, the distal opening 199 of indicator housing 190 is adapted to slide over body top 146 and the proximal end 156 of gage body 144.

Figure 2:
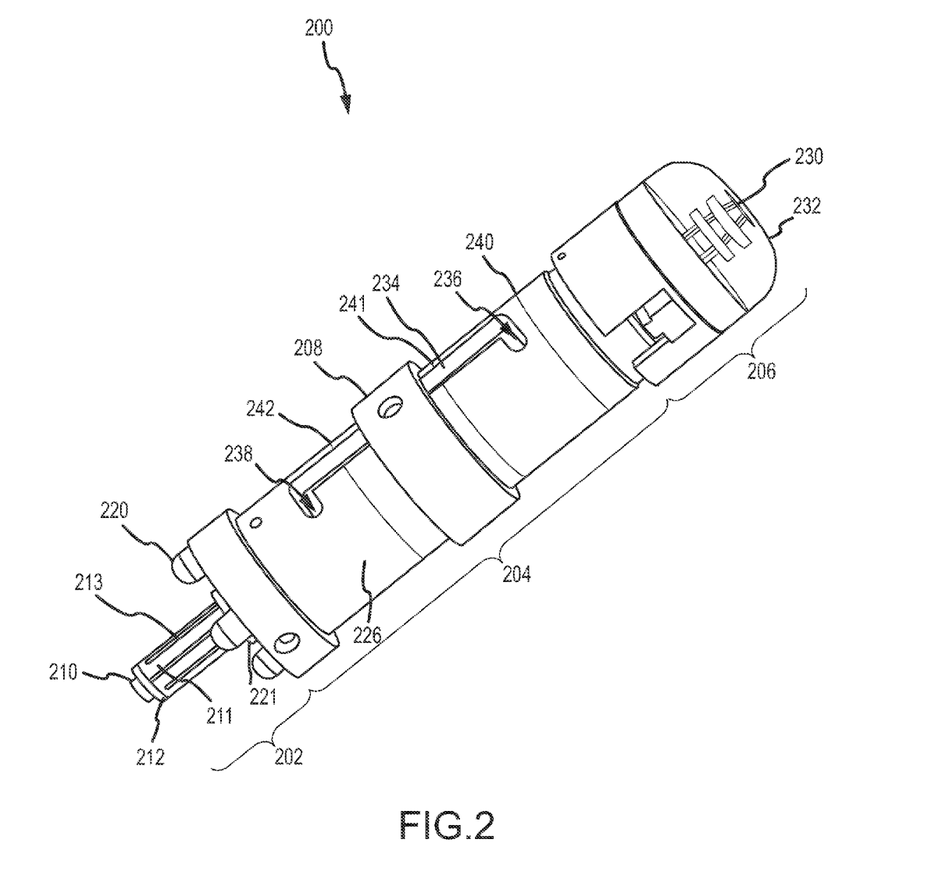
FIG. 2 illustrates a perspective view of an assembled hole angularity gage, in accordance with an example embodiment.

FIG. 2 illustrates a perspective view of an assembled hole angularity gage 200, in accordance with an example embodiment. Gage 200 includes a hole probe and center pin subassembly 202, a gage body subassembly 204, an indicator subassembly 206, and a contact disc subassembly, of which only a sliding member 208 is illustrated in FIG. 2. The components included within each of these subassemblies were discussed in conjunction with FIG. 1. The adjustment and interoperation of the subassemblies and components will now be discussed in conjunction with FIG. 2.

Hole probe and center pin subassembly 202 include tapered pin 210, outer collet 211, inner collet 212, and retaining pin (not illustrated in FIG. 2), as mentioned previously, which together form a hole probe. The shaft portions of outer collet 211 and inner collet 212 include one or more slots, grooves or other features 213 (inner collet features are hidden, in FIG. 2), which enable outer collet 211 and inner collet 212 to expand and contract, in diameter. In an embodiment, tapered pin 210 has a distal end diameter that is less than a proximal end diameter. Accordingly, tapered pin 210 functions to adjust a diameter of outer collet 211 and inner collet 212, as tapered pin 210 is advanced into or out of inner collet 212. More specifically, the diameters of outer collet 211 and inner collet 212 may be increased or reduced, in an embodiment, when tapered pin 210 is advanced or retracted further into or out of, respectively, an inner collet central channel (e.g., inner collet central channel 129, FIG. 1). As will be explained in more detail in conjunction with FIGS. 6 and 7, when the hole probe is inserted into a hole, a lip 221 of outer collet 211 contacts the top surface of the component within which the hole is formed. As the gage 200 is pushed further toward the surface, the tapered pin 210 is advanced further into the inner collet central channel. As wider portions of the tapered pin 210 are advanced into the inner collet 212, the outer diameter of the inner collet 212 is forced to increase, which in turn forces the outer diameter of the outer collet 211 to increase. Eventually, the outer diameter of the outer collet 211 will substantially equal the hole diameter. When the gage 200 is pulled away from the surface, the tapered pin 210 may retract from the inner collet 212, and thus the outer diameters of the inner collet 212 and outer collet 211 may contract, and the hole probe may be removed from the hole. The hole probe assembly, described above, provides an advantage, in that it enables the hole probe diameter automatically to be adjusted without a plurality of attachable hole probes.

During use, outer collet 211 is inserted into a hole, and surface contact points 220 make contact with the surface within which the hole is formed. When the hole axis is not perpendicular to the surface, outer collet 211 may be forced to rotate, with respect to the center of rotation of the bearing (e.g., bearing 126, FIG. 1). Accordingly, the center pin axis (e.g., axis 130, FIG. 1) may rotate with respect to the primary gage axis (e.g., primary gage axis 102, FIG. 1), thus causing the top of the center pin (e.g., center pin 128, FIG. 1) to move within the gage body subassembly 204 toward the contact disc (e.g., contact disc 172, FIG. 1), which is located within the gage body 226 of gage body subassembly 204. The contact disc forms a portion of the contact disc subassembly (hidden in FIG. 2), as discussed previously. When the hole angle is sufficient, the center pin may touch the contact disc. As will be described in more detail later, this may close a circuit and cause light 230 of the indicator subassembly 206 to activate and to produce light. In an embodiment, cover 232 is formed from a transparent or semi-transparent material, and thus the light may be visible through cover 232. Activation of light 230 indicates that the hole angle is greater than a gage setting angle.

In an embodiment, hole angularity gage 200 may be adjusted to any angle within a range of gage setting angles. This adjustment is accomplished by sliding the contact disc subassembly within the central channel (e.g., central channel 158, FIG. 1) of gage body 226. As discussed previously, sliding member 208 is coupled, through one or more elongated apertures 234 in gage body 226, to those portions of the contact disc subassembly that are disposed within the central channel (e.g., the "internal" portions). The internal portions of the calibration and adjustment assembly include the contact disc (e.g., contact disc 172, FIG. 1). Accordingly, when sliding member 208 is slid back and forth over the gage body 226, the contact disc slides back and forth within the central channel. The position of the contact disc within the gage body 226 defines the gage setting angle. In an embodiment, the gage body 226 may include a number of markings or features 240, 241, 242 which indicate different gage setting angles. When the sliding member 208 is aligned with a particular marking or feature 240-242, the hole angularity gage 200 is set to the gage setting angle indicated by the particular marking or feature 240-242. In an embodiment, each elongated aperture 234 may include one or more indentations 236, 238, each of which corresponds to a particular gage setting angle. The sliding member 208 may be moved to an indentation 236, 238 and rotated so that the sliding member 208 is locked into position at a particular gage setting angle. In an embodiment, this is accomplished when the connectors (e.g., connector 184, FIG. 1), which are disposed between the sliding member 208 and the internal portions of the contact disc subassembly, are moved into indentation 236 or other indentations that may exist between indentations 236 and 238. This may result in a precise setting of the gage setting angle and may also restrict sliding of the sliding member 208 along the elongated aperture 234 during use.

Because of the configuration of the various components, hole angularity gage 200 may be scaled to relatively small dimensions. For example, a length of hole angularity gage 200 may be in a range of 9-20 centimeters, although the length may be longer or shorter, in other embodiments. A width (e.g., a diameter) of hole angularity gage 200 may be in a range of 2.5-10 centimeters, although the width may be larger or smaller, in other embodiments. Because hole angularity gages of the various embodiments may be relatively small in scale, they may be used to measure holes that traditional hole angularity gages are unable to measure, such as holes that are in areas with close vertical or ceiling obstructions.

Figure 3:
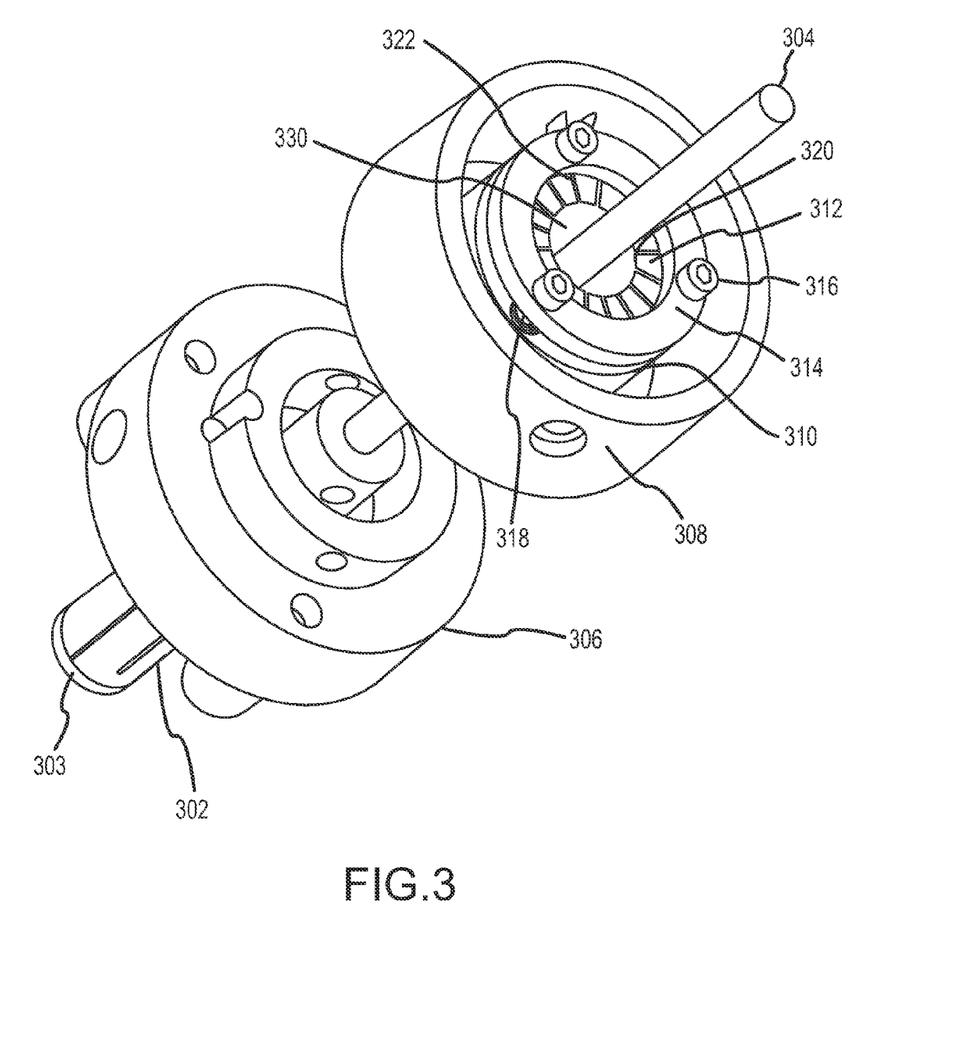
FIG. 3 illustrates a perspective view of a hole probe and center pin subassembly juxtaposed with a contact disc subassembly, in accordance with an example embodiment.

FIG. 3 illustrates a perspective view of a hole probe and center pin subassembly juxtaposed with a contact disc subassembly, in accordance with an example embodiment. The hole probe and center pin subassembly includes outer collet 302, inner collet 303, and center pin 304, among other things. Outer collet 302 and center pin 304 are pivotally connected to the gage body (e.g., gage body 144, FIG. 1, which is not illustrated in FIG. 3) at the center of rotation of a bearing (e.g., bearing 126, FIG. 1), which is positioned within bearing holder 306.

The contact disc subassembly includes sliding member 308, inner ring 310, and contact disc 312. The inner ring 310 and contact disc 312 may be held together with an assembly ring 314, screws 316, and springs 318, as discussed previously. Inner ring 310, contact disc 312, and assembly ring 314 are slidably positioned within the gage body (e.g., gage body 144, FIG. 1) via movement of sliding member 308, as discussed previously.

Center pin 304 extends through a central opening, which is defined by a substantially circular inner edge 320 of contact disc 312. When properly calibrated and prior to use, a radial gap 330 exists between and around center pin 304 and the inner edge 320 of contact disc 312. During use, when outer collet 302 is inserted into a non-perpendicular hole, center pin 304 may rotate toward the inner edge 320 of contact disc 312, where the center of rotation is located at the center of a bearing (e.g., bearing 126, FIG. 1), as discussed previously. The angle of rotation is a function of the hole angle. When the hole angle equals or exceeds a gage setting angle, center pin 304 may make physical contact with contact disc 312. As will be described in more detail below, such physical contact may close a circuit, which may cause activation of an indicator (e.g., indicator 196, FIG. 1). Contact disc 312 may include one or more slots, grooves or other features 322, which enable the inner edge 320 to deflect, without damage to contact disc 312, when center pin 304 is compressed against the inner edge 320 of contact disc 312.

As mentioned previously, contact disc subassembly may be positioned, within the gage body (e.g., gage body 144, FIG. 1) to provide indication of a range of gage setting angles. The gage setting angle is a function of the distance between the center of rotation of the bearing (e.g., bearing 126, FIG. 1) and the contact disc 312. A relatively short distance corresponds to a relatively large gage setting angle, and a relatively long distance corresponds to a relatively small gage setting angle. In an embodiment, a hole angularity gage may be adjusted to gage setting angles in a range of about 2 degrees to about 4 degrees. In other embodiments, a hole angularity gage may be adjusted to larger, smaller or different ranges of gage setting angles.

Figure 4:
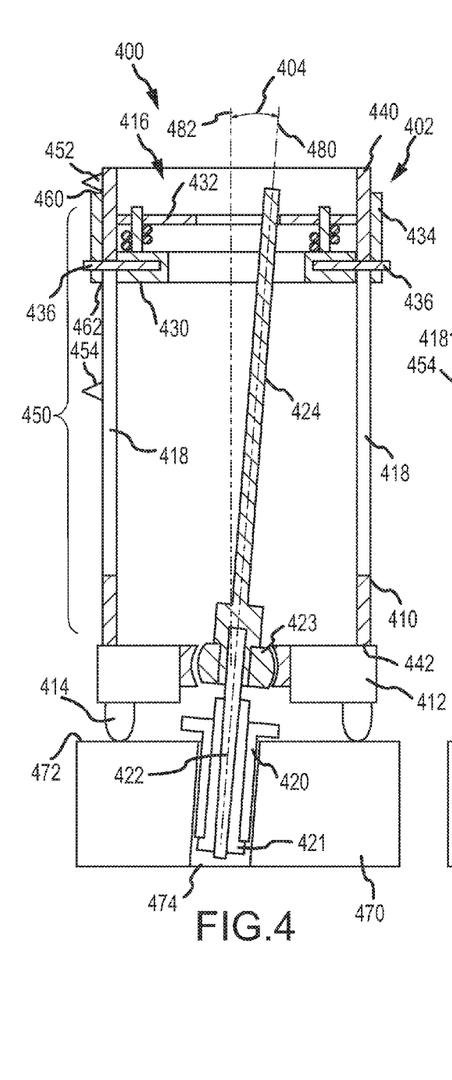
FIG. 4 illustrates a simplified, cross-sectional view of a portion of a hole angularity gage with a contact disc subassembly set to a first gage setting angle, in accordance with an example embodiment.

FIG. 4 illustrates a simplified, cross-sectional view of a portion of a hole angularity gage 400 with a contact disc subassembly 402 set to a first gage setting angle, in accordance with an example embodiment. As was discussed previously, hole angularity gage 400 may include a gage body subassembly (e.g., gage body subassembly 112, FIG. 1), a hole probe and center pin subassembly (e.g., hole probe and center pin subassembly 110, FIG. 1), and the contact disc subassembly (e.g., contact disc subassembly 114, FIG. 1), portions of which are illustrated in FIG. 4. The gage body subassembly includes a gage body 410, a bearing holder 412, and surface contact members 414. The gage body 410 defines a central channel 416, and includes at least two elongated apertures 418. The hole probe and center pin subassembly includes outer collet 420, inner collet 421, tapered pin 422, spherical ball bearing 423, and center pin 424. The contact disc subassembly 402 includes inner ring 430, contact disc 432, sliding member 434, and connectors 436.

Prior to or during use, a gage user may slide the contact disc subassembly 402 up and down, within the central channel 416 of gage body 410, by sliding the sliding member 434 up and down along the outer surface of gage body 410. In FIG. 4, the contact disc subassembly 402 is shown in a highest position, which is the closest position to a proximal end 440 of gage body 410. In other words, the contact disc subassembly 402 is positioned farthest from a distal end 442 of gage body 410, which is the end nearest bearing holder 412. When the contact disc subassembly 402 is located in the highest position, a first distance 450 is established between the bearing holder 412 and the contact disc 432.

In an embodiment, the highest position corresponds to a lowest gage setting angle, which angle may be identified by a first marking 452 on the surface of gage body 410. Alternatively, a gage setting angle may be identified by some other feature. Gage 400 may be set to the lowest gage setting angle when the gage user aligns sliding member 434 with the first marking 452. In an embodiment, alignment may be achieved when a top edge 460 of sliding member 434 is lined up with a marking (e.g., first marking 452 or second marking 454). In other embodiments, alignment may be achieved when a bottom edge 462 is lined up with a marking or when a window (not illustrated) in sliding member 434 is lined up with a marking. As mentioned previously, the contact disc subassembly 402 may be locked at a particular gage setting angle by rotating connectors 436 into indentations (e.g., indentations 236 or 238, FIG. 2) of the elongated apertures 418.

FIG. 4 also illustrates a component 470 having a top surface 472 through which a hole 474 is formed. Hole 474 may be formed so that a hole axis 480 either is or is not substantially coincident with a surface-perpendicular axis 482. During use, outer collet 420 may be inserted into hole 474, and gage 400 may be moved toward the component 470 until surface contact members 414 make contact with the top surface 472. When hole 474 is not substantially perpendicular to the top surface 472, outer collet 420 and bearing 422 will cause center pin 424 to rotate toward contact disc 432. The angular rotation represents the angular offset between surface-perpendicular axis 482 and hole axis 480, which corresponds to the hole angle 404. When the hole angle 404 is equal to or greater than the gage setting angle, center pin 424 may physically contact the contact disc 432. As will be explained in more detail in conjunction with FIG. 8, such physical contact between center pin 424 and contact disc 432 closes a circuit, which causes an indicator (e.g., indicator 196, FIG. 1) to activate. When the hole angle 404 is less than the gage setting angle, center pin 424 may not physically contact the contact disc 432, and thus the circuit may not be closed (e.g., the circuit remains open) and the indicator may not activate.

Figure 5:
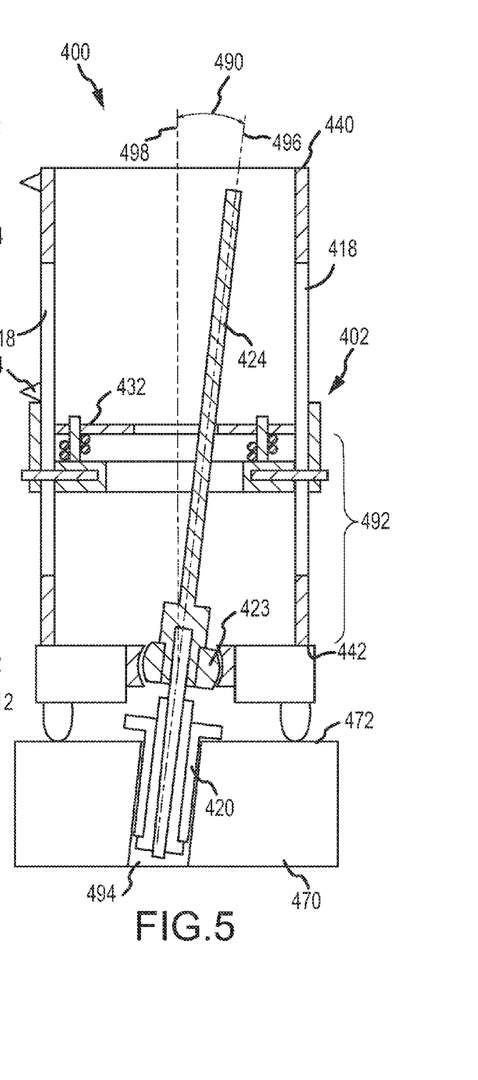
FIG. 5 illustrates a simplified, cross-sectional view of the portion of the hole angularity gage of FIG. 4 with the contact disc subassembly set to a second gage setting angle, in accordance with an example embodiment.

FIG. 5 illustrates a simplified, cross-sectional view of the portion of the hole angularity gage 400 of FIG. 4 with the contact disc subassembly 402 set to a second gage setting angle, in accordance with an example embodiment. In FIG. 5, the contact disc subassembly 402 is shown in a second position, which is further toward the proximal end 440 of gage body 410. In other words, the contact disc subassembly 402 is positioned closer to the distal end 442 of gage body 410. When the contact disc subassembly 402 is located in the second position, a second distance 492 is established between the bearing holder 412 and the contact disc 432. In an embodiment, the second position corresponds to a second gage setting angle, which angle may be identified by a second marking 454 on the surface of gage body 410. Gage 400 may be set to the second gage setting angle when the gage user aligns sliding member 434 with a second marking 454, in an embodiment. Additional indentations (not illustrated) in the elongated apertures 418 may enable the contact disc subassembly 402 to be locked into the second position.

FIG. 5 also illustrates component 470 having a second hole 494 formed through top surface 472. Hole 494 may be formed to define a second hole axis 496. Once again, when hole 494 is not substantially perpendicular to the top surface 472, outer collet 420 and bearing 422 will cause center pin 424 to be rotated toward contact disc 432. The angular rotation represents the angular offset between surface-perpendicular axis 498 and hole axis 496, which corresponds to the hole angle 490. When the hole angle 490 is equal to or greater than the gage setting angle, center pin 424 may physically contact the contact disc 432, causing an indicator (e.g., indicator 196, FIG. 1) to activate. When the hole angle 490 is less than the gage setting angle, center pin 424 may not physically contact the contact disc 432, and thus the circuit may not be closed (e.g., the circuit remains open) and the indicator may not activate. Comparison of FIGS. 4 and 5 illustrate that gage 400 may be set to a range of gage setting angles, where a relatively small hole angle 404 may be indicated at a first gage setting angle, and a relatively large hole angle 490 may be indicated at a second gage setting angle. In an embodiment, the largest gage setting angle corresponds to the contact disc subassembly 402 being set to a lowest position (e.g., a position closest to the proximal end 440 of gage body 410). This may be a position in which hole angle measurements may be taken, in an embodiment, or alternatively this may be considered a stowed position.

Figure 6:
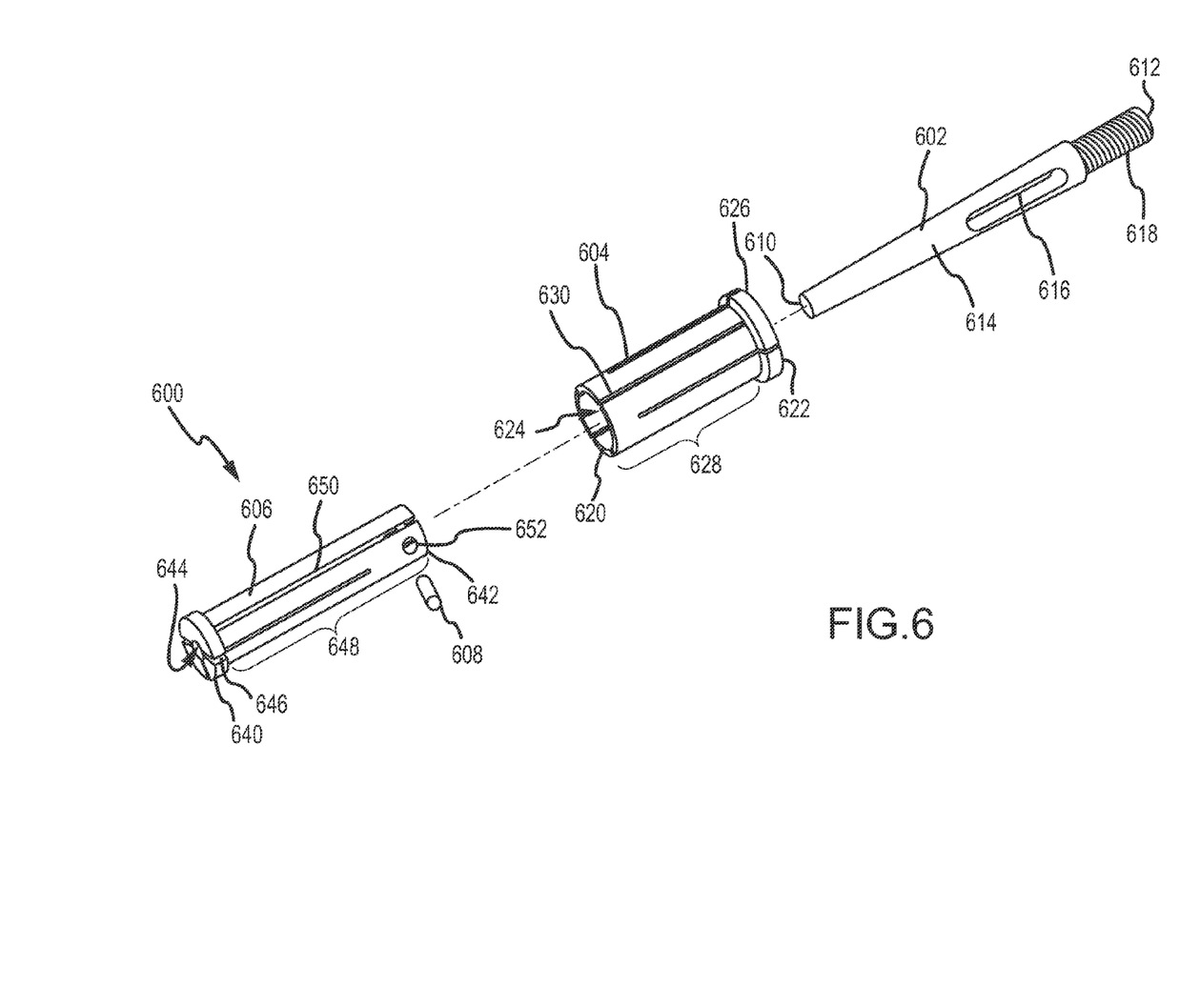
FIG. 6 illustrates an exploded view of a hole probe subassembly, in accordance with an example embodiment.

FIG. 6 illustrates an exploded view of a hole probe subassembly 600, in accordance with an example embodiment. The hole probe subassembly 600 includes tapered pin 602, outer collet 604, inner collet 606, and retaining pin 608. Tapered pin 602 has a distal end 610 and a proximal end 612, and includes a tapered shaft 614, a slot 616, and a threaded portion 618, in an embodiment. The diameter of tapered shaft 614 is narrower at distal end 610 and wider at proximal end 612, in an embodiment. Outer collet 604 has a distal end 620 and a proximal end 622, and includes a central channel 624 between the distal end 620 and the proximal end 622, a lip 626 at the proximal end 622, a shaft 628, and one or more slots, grooves or other features 630 on shaft 628, which extend between distal end 620 and proximal end 622. Inner collet 606 has a distal end 640 and a proximal end 642, and includes a central channel 644 between the distal end 640 and the proximal end 642, a lip 646 at the distal end 640, a shaft 648, one or more slots, grooves or other features 650 on shaft 648, and a retaining pin hole 652. To assemble the hole probe subassembly, the proximal end 642 of inner collet 606 is slid into the distal end 620 of the central channel 624 of outer collet 604, until the retaining pin hole 652 is exposed, and the distal end 620 of outer collet 604 rests on the lip 646 of inner collet 606. The distal end 610 of tapered pin 602 is slid into the proximal end 642 of the central channel 644 of the inner collet 606, until slot 616 aligns with the retaining pin hole 652. The retaining pin 608 is then slid through retaining pin hole 652 and into slot 616.

Figure 7:
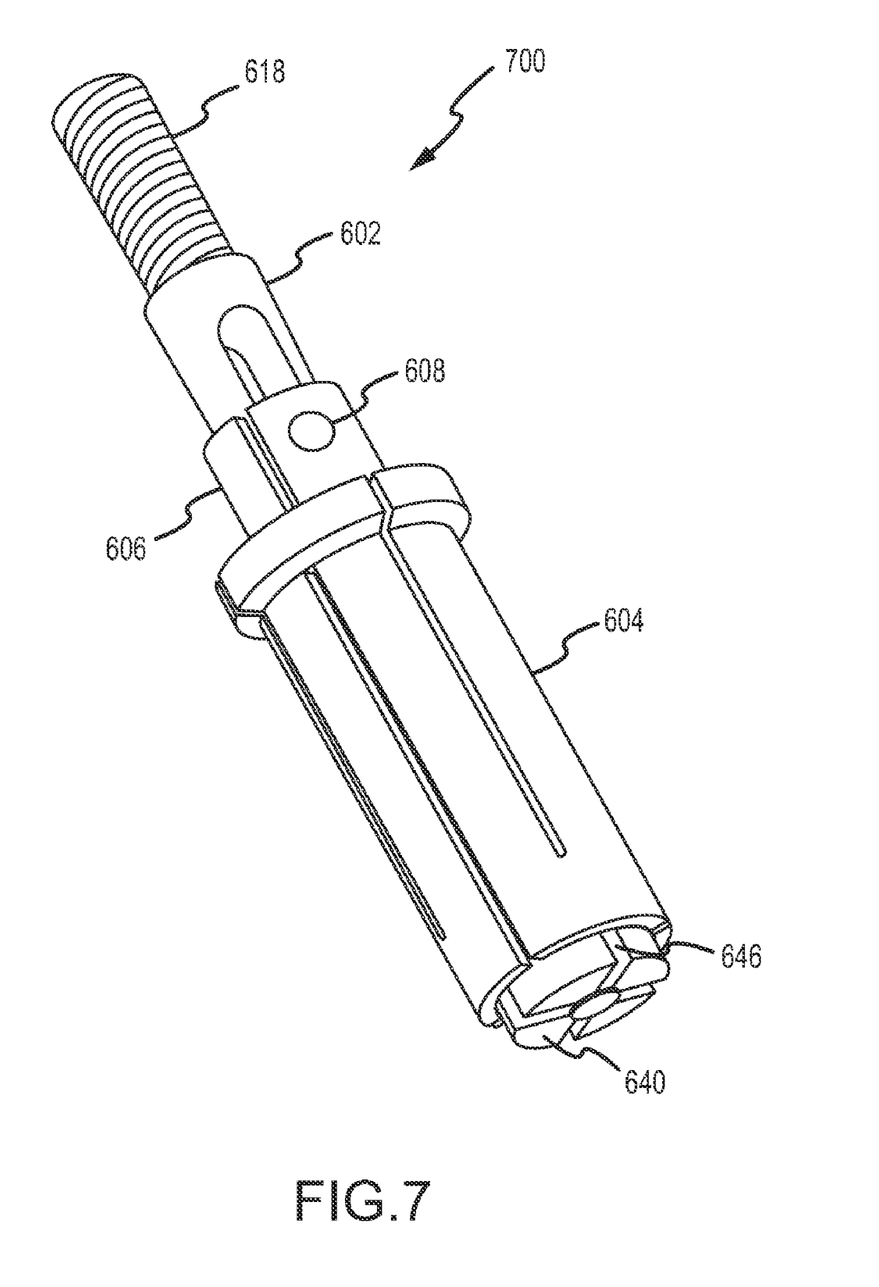
FIG. 7 illustrates a perspective view of an assembled hole probe subassembly, in accordance with an example embodiment.

FIG. 7 illustrates a perspective view of an assembled hole probe subassembly 700, in accordance with an example embodiment. The hole probe assembly 700 includes the inner collet 606 inserted into the central channel of the outer collet 604 (e.g., central channel 624, FIG. 6), and the tapered pin 602 inserted into the central channel of the inner collet 606 (e.g., central channel 644, FIG. 6). The tapered pin 602 is slidably engaged with inner collet 606 via retaining pin 608, which is inserted through the retaining pin hole of inner collet (e.g., retaining pin hole 652) and the slot of tapered pin 602 (e.g., slot 616, FIG. 6). When not inserted into a hole, the inner collet 606 and the outer collet 604 may be loosely engaged, where lip 646 at the distal end 640 of inner collet 606 retains outer collet 604.

The hole probe subassembly 700 may be connected with a bearing (e.g., bearing 126, FIG. 1) and center pin (e.g., center pin 128, FIG. 1) via threaded portion 618. In an embodiment, a distal end of the center pin may be inserted through a central channel of bearing (e.g., central channel 131, FIG. 1), and threaded portion 618 may be screwed into a hole in the distal end of the center pin (e.g., hole 133, FIG. 1), which includes complementary threads.

Referring again to FIGS. 1 and 4, and as mentioned briefly above, when center pin 424 (FIG. 4) contacts contact disc 432 (FIG. 4), a circuit may be closed, which causes an indicator 196 (FIG. 1) to activate. In an embodiment, this circuit is formed from various conductive components of a hole angularity gage. In a particular embodiment, all or portions of the following components are formed from conductive materials, which adapt them to form portions of a hole angularity gage circuit: gage body (e.g., gage body 144, FIG. 1); lock pin (e.g., lock pin 195); sliding member (e.g., sliding member 178); connector (e.g., connector 184); inner ring (e.g., inner ring 170); screws (e.g., screws 175); contact disc (e.g., contact disc 174); center pin (e.g., center pin 128); and bearing (e.g., bearing 126). Along with the conductive components indicated above, the hole angularity gage circuit may also include one or more wires, pads, conductive traces or other conductive elements. The term "conductive material," as used herein, means a material that has a relatively low electrical resistance. Examples of conductive materials include, but are not limited to, aluminum, steel, copper, nickel, bronze, tin, lead, gold, silver, alloys thereof, and/or other conductive materials.

Other components of a hole angularity gage are formed from insulating materials, in an embodiment, which may adapt those components to insulate certain ones of the conductive components from each other. For example, in a particular embodiment, all or portions of the following components are formed from insulating materials: bearing holder (e.g., bearing holder 140); body top (e.g., body top 146); and indicator housing (e.g., indicator housing 190). The term "insulator material," as used herein, means a material that has a relatively high electrical resistance. Examples of insulator materials include, but are not limited to, polymers (e.g., plastics, rayon, celluloid, nylon, polyethylene, polyurethane, polytetrafluoroethylene (PTFE), polystyrene, polyvinyl chloride (PVC), phenol formaldehyde, synthetic rubber), ethylene tetrafluoroethylene (ETFE), silicone, glass, ceramics, porcelain, rubber, (e.g., silicone rubber, or ethylene propylene diene monomer rubber), and paper.

Figure 8:
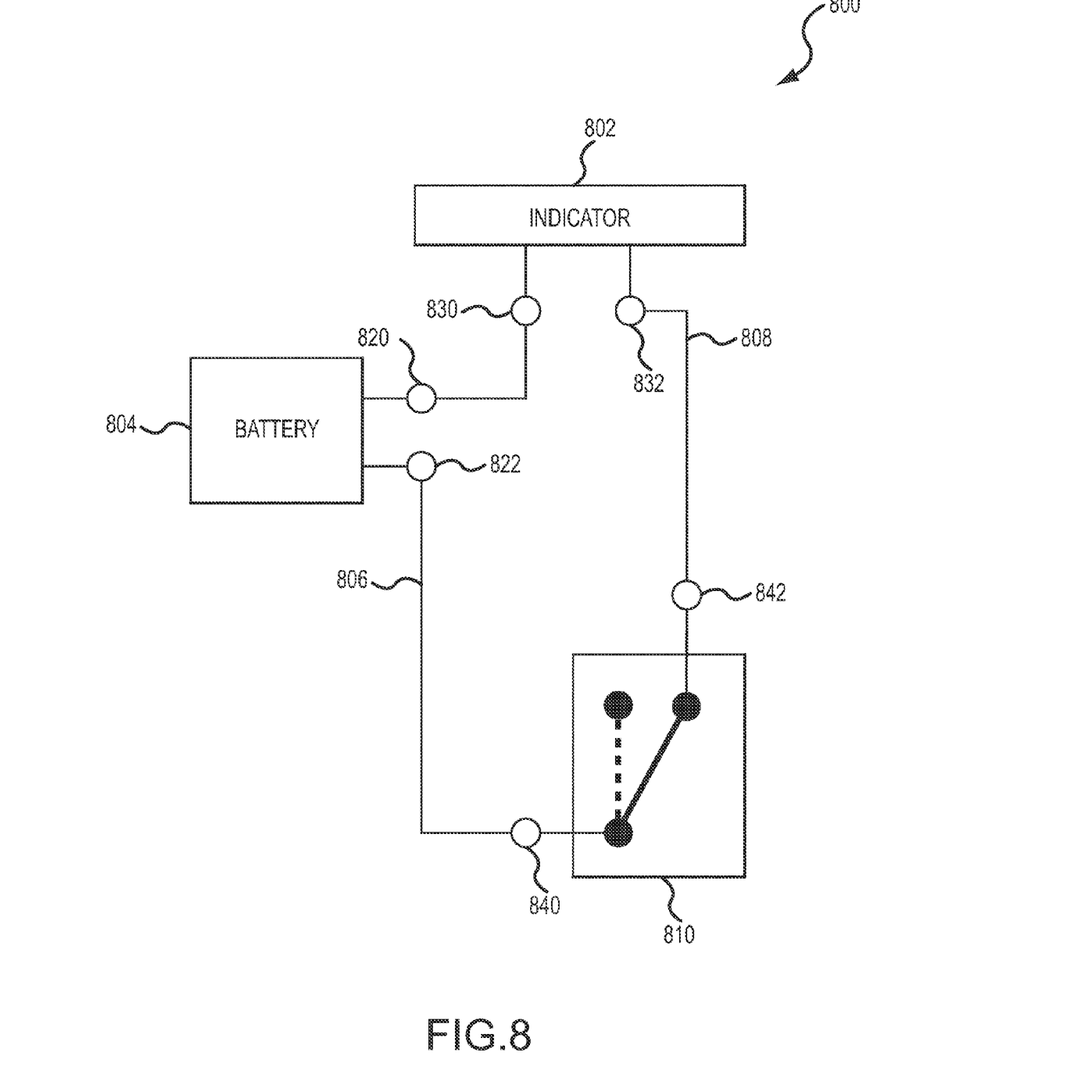
FIG. 8 illustrates a hole angularity gage circuit, in accordance with an example embodiment.

FIG. 8 illustrates a hole angularity gage circuit 800, in accordance with an example embodiment. Circuit 800 includes indicator 802, battery 804, first conductive path 806, second conductive path 808, and switch 810. In an embodiment, a first terminal 820 of battery 804 (e.g., a positive terminal) is electrically coupled to a first terminal 830 of indicator 802. A second terminal 822 of battery 804 (e.g., a negative terminal) is electrically coupled to first conductive path 806. First conductive path 806 also is electrically coupled to a first terminal 840 of switch 810. A second terminal 842 of switch 810 is electrically coupled to second conductive path 808, which in turn is electrically coupled to a second terminal 832 of indicator 802.

Battery 804 is adapted to provide current through indicator 802 when switch 810 is in a closed position, shown as a solid line, in FIG. 8 (an open position is indicated as a dashed line). When switch 810 is in the closed position, circuit 800 is also closed. When a current is provided through indicator 802, indicator 802 may be activated. For example, indicator 802 may include, for example, an LED or other light, a sound device (e.g., a speaker and associated electronics), a small display element, or another type of indicator that adapted to produce a binary indication of whether circuit 800 is closed or open. Battery 804 may include, for example, a compact button-type battery, although other types of batteries may be used. In other embodiments, battery 804 may be replaced by another power source, such as alternating current (AC) line power (e.g., provided through an electrical cord or plug).

First conductive path 806 includes a first group of conductive components of a hole angularity gage. In a particular embodiment, first conductive path 806 includes a conductive spring arm of a battery holder (e.g., battery holder 192, FIG. 1); a conductive pad or connector (not illustrated), which is insulated from and proximate to the proximal end of the gage body (e.g., proximal end 156, FIG. 1); a wire (not illustrated); and bearing (e.g., bearing 126). When a battery is inserted into the battery holder (e.g., battery holder 192), the spring arm may contact a battery terminal (e.g., second terminal 822). When the indicator subassembly (e.g., indicator subassembly 116) is assembled with the gage body subassembly (e.g., gage body subassembly 112), a conductive path may be established between the spring arm and the conductive pad. The conductive pad may be located on the body top (e.g., body top 146, FIG. 1), for example. The wire may be soldered or otherwise connected to the conductive pad, and may extend from the conductive pad to the bearing (e.g., bearing 126). In an embodiment, the wire may be located on an outside surface of the gage body. For example, the gage body may include a groove or other feature, which is adapted to hold the wire. In another embodiment, the wire may extend through the central channel (e.g., central channel 158) of the gage body.

Switch 810 is adapted to function as a mechanical dipole switch, in an embodiment. Switch 810 includes a second group of conductive components of a hole angularity gage. In a particular embodiment, switch 810 includes a center pin (e.g., center pin 424, FIG. 4) and a contact disc (e.g., contact disc 432). As discussed previously in conjunction with FIGS. 4 and 5, the center pin 424 may be rotated to contact the contact disc 432, when a hole angle (e.g., hole angle 404, 490) exceeds a gage setting angle. When physical contact is established between the center pin 424 and the contact disc 432, switch 810 is closed, producing a closed circuit condition for circuit 800. Otherwise, switch 810 is open. The first terminal 840 of switch 810 is electrically connected to the first conductive path 806 through physical contact between the bearing (e.g., bearing 126, FIG. 1) and the center pin (e.g., center pin 128). Accordingly, the first terminal 840 corresponds to a portion of the center pin that contacts the bearing. The second terminal 842 of switch 810 is electrically connected to the second conductive path 808. The second terminal 842 corresponds to a portion of the contact disc that contacts the second conductive path 808.

Second conductive path 808 includes a third group of conductive components of a hole angularity gage. In a particular embodiment, second conductive path 808 includes screws (e.g., screws 175, FIG. 1); an inner ring (e.g., inner ring 170), a sliding member (e.g., sliding member 178), a connector between the inner ring and the sliding member (e.g., connector 184), gage body (e.g., gage body 144), a lock pin (e.g., lock pin 195), and a conductive connector between the lock pin and the second terminal 832 of indicator 802.

Figure 9:
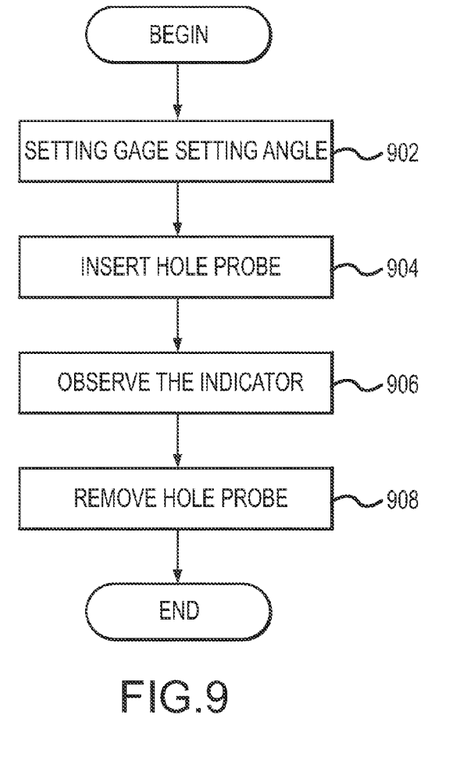
FIG. 9 illustrates a flowchart of a method for using a hole angularity gage to indicate an out-of-tolerance condition, in accordance with an example embodiment.

FIG. 9 illustrates a flowchart of a method for using a hole angularity gage to indicate an out-of-tolerance hole angle for a hole formed in a component, in accordance with an example embodiment. The method may begin, in block 902, when a gage user sets the hole angularity gage to a particular gage setting angle. For example, the gage setting angle may correspond to a hole angle that is considered to be out-of-tolerance. For example, if a hole angle equal to or exceeding 2 degrees is considered out-of-tolerance, then the gage user may set the hole angularity gage to a gage setting angle of 2 degrees. As discussed previously, a gage user may set the gage setting angle by aligning the sliding member (e.g., sliding member 178, FIG. 1) of the contact disc subassembly (e.g., contact disc subassembly 114) with a marking or other feature (e.g., marking 240, FIG. 2) on the gage body (e.g., gage body 226). The sliding member may be rotated, so that connectors (e.g., connectors 184) between the sliding member and the inner portions of the contact disc subassembly move into indentations (e.g., indentations 236) within the elongated apertures (e.g., elongated apertures 234). This may lock the sliding member into position at a desired gage setting angle.

In block 904, the gage user may then insert the hole probe (e.g., outer collet 121, FIG. 1) into a hole that is being measured, and may move the gage toward the component until surface contact members (e.g., surface contact members 142) make contact with the top surface of the component. As discussed previously in detail, when the hole is not substantially perpendicular to the top surface, the hole probe will cause a center pin (e.g., center pin 128) to rotate toward a contact disc (e.g., contact disc 172), within the hole angularity gage. When the hole angle is equal to or greater than the gage setting angle, the center pin may physically contact the contact disc, which closes a circuit within the gage, and causes an indicator to activate (e.g., indicator 196, FIG. 1, may turn on). When the hole angle is less than the gage setting angle, the center pin may not physically contact the contact disc, and thus the circuit may not be closed (e.g., the circuit remains open) and the indicator may not activate (e.g., indicator 196, FIG. 1, may remain off).

In block 906, the gage user may observe the indicator to determine whether it has or has not been activated. When the indicator has been activated, the gage user may determine that the hole angle is out-of-tolerance. When the indicator has not been activated, the gage user may determine that the hole angle is not out-of-tolerance (e.g., it is in tolerance). In block 908, the gage user may remove the hole probe from the hole, and the method may end. Because the gage user may determine whether a hole angle is out-of-tolerance through the mere observation of the indicator, hole angularity gages of the various embodiments may have an advantage, over traditional hole angularity gages, of a more rapid out-of-tolerance determination.

The flowchart of FIG. 9 illustrates a method for using a hole angularity gage to determine whether a hole angle is or is not out-of-tolerance. Embodiments of hole angularity gages also may be used to measure a hole angle, when the hole angle falls within the range of gage setting angles of the hole angularity gage.

Figure 10:
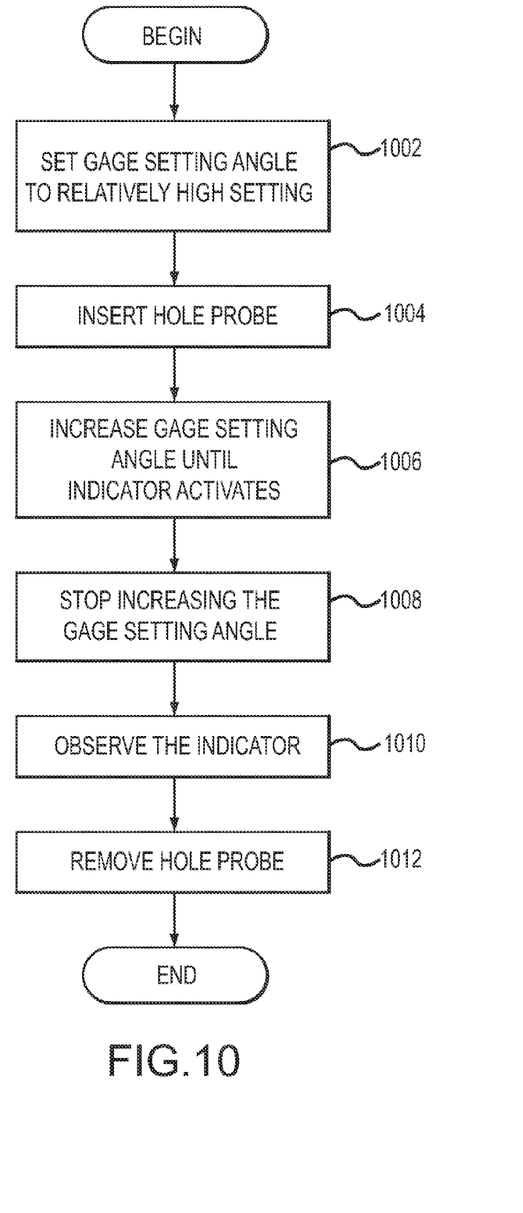
FIG. 10 illustrates a flowchart of a method for using a hole angularity gage to measure a hole angle, in accordance with an example embodiment.

FIG. 10 illustrates a flowchart of a method for using a hole angularity gage to measure a hole angle, in accordance with an example embodiment. The method may begin, in block 1002, when a gage user sets the hole angularity gage to a relatively high gage setting angle. For example, the gage user may set the hole angularity gage to a highest gage setting angle by sliding the sliding member (e.g., sliding member 178, FIG. 1) of the contact disc subassembly (e.g., contact disc subassembly 114) to a lowest position (e.g., a position closest to the distal end 442 of the gage body 410, as illustrated in FIG. 5).

In block 1004, the gage user may then insert the hole probe (e.g., outer collet 121, FIG. 1) into a hole that is being measured, and may move the gage toward the component until surface contact members (e.g., surface contact members 142) make contact with the top surface of the component. Assuming that the hole angle is not equal to or greater than the gage setting angle corresponding to the lowest position, the circuit within the gage should remain open, and thus the indicator may not be activated (e.g., indicator 196, FIG. 1, may remain off).

In block 1006, the gage user may then slowly increase the gage setting angle by sliding the sliding member (e.g., sliding member 178) up the gage body toward a highest position (e.g., a position closest to the proximal end 440 of the gage body 410, as illustrated in FIG. 4). Assuming that the hole angle is an angle between the lowest gage setting angle and the highest gage setting angle, the center pin will physically contact the contact disc at some point, as the sliding member is slid up the gage body. When the gage setting angle becomes equal to or less than the hole angle, the center pin may physically contact the contact disc, which closes a circuit within the gage, and causes the indicator (e.g., indicator 196) to activate (e.g., indicator 196, FIG. 1, may turn on).

When this occurs, in block 1008, the gage user may stop increasing the gage setting angle by ceasing to slide the sliding member. The gage user may then observe the gage setting angle, in block 1010. In an embodiment, observation of the gage setting angle may be achieved by determining which marking or feature (e.g., marking 241, FIG. 2) the sliding member is most nearly aligned with. The hole angle may be substantially equally to the gage setting angle indicated by that marking. In block 1012, the gage user may remove the hole probe from the hole, and the method may end.

The flowchart of FIG. 10 describes determining a hole angle by sliding the sliding member until an indicator activates (e.g., indicator 196, FIG. 1, turns on). In an alternate embodiment, a hole angle may be determined by a gage user setting the hole angularity gage to a relatively low gage setting angle. Assuming that the hole angle is equal to or greater than the gage setting angle, the indicator will be activated (e.g., indicator 196 will be on). The gage user may then slide the sliding member toward down the gage body toward a lowest position (e.g., a position closest to the distal end 442 of the gage body 410, FIG. 4) until the indicator deactivates (e.g., indicator 196 turns off). At that point, the gage user may cease sliding the sliding member, and may observe the gage setting angle. The hole angle may be substantially equally to the gage setting angle indicated by that marking.

Figure 11:
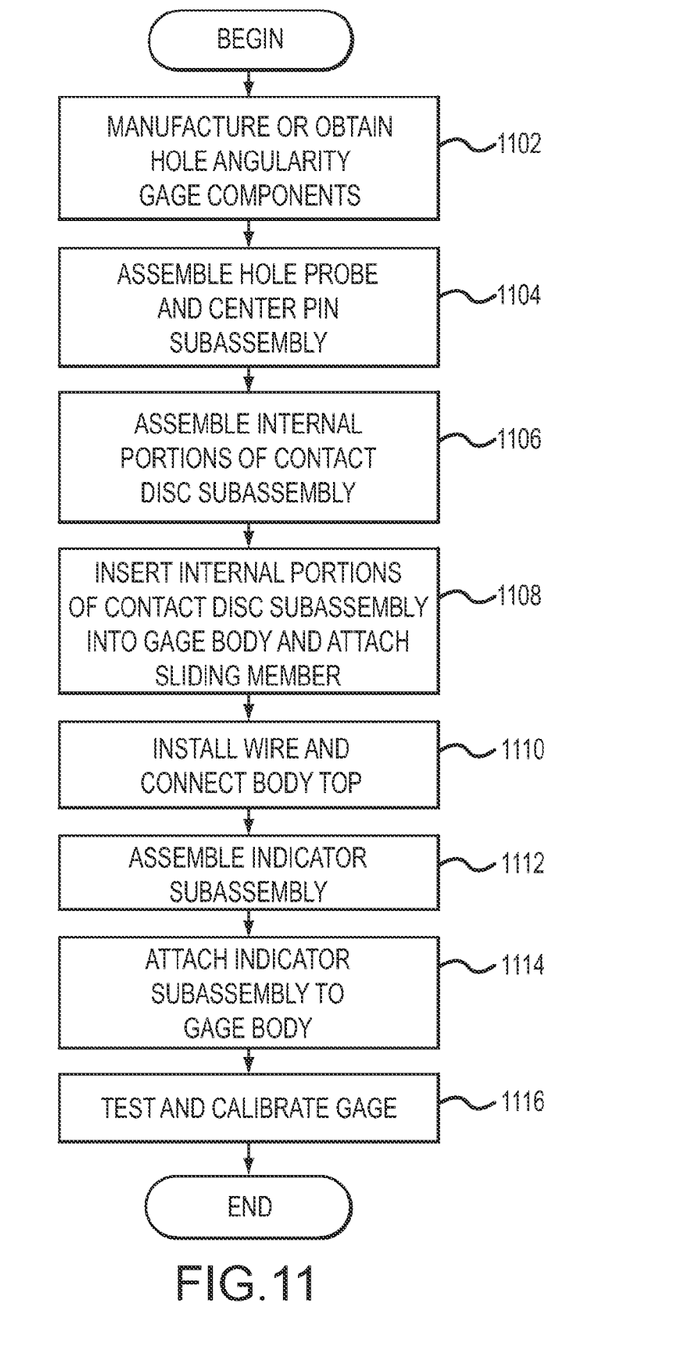
FIG. 11 illustrates a flowchart of a method for manufacturing a hole angularity gage, in accordance with an example embodiment.

FIG. 11 illustrates a flowchart of a method for manufacturing a hole angularity gage, in accordance with an example embodiment. Although the processes illustrated in FIG. 11 are shown in a particular order, it is to be understood that the illustrated order corresponds to a particular embodiment. In other embodiments, some of the processes may be performed in parallel and/or in different orders, while still achieving the same result. Accordingly, variations in the ordering of the processes illustrated in FIG. 11 are intended to be included within the scope of the inventive subject matter.

The method may begin, in block 1102, by manufacturing or obtaining the various components of the hole angularity gage, such as the components illustrated in FIG. 1, and other components discussed herein. In block 1104, a hole probe and center pin subassembly (e.g., hole probe and center pin subassembly 110, FIG. 1) may be assembled together with a bearing holder (e.g., bearing holder 140) and a gage body (e.g., gage body 144). In an embodiment, this includes assembling an inner collet (e.g., inner collet 124), an outer collet (e.g., outer collet 122), a tapered pin (e.g., tapered pin 120), and a retaining pin (e.g., retaining pin 125). A distal end of the center pin (e.g., center pin 128) may be inserted through a central channel of a bearing (e.g., central channel 132 of bearing 126), and a proximal end of the tapered pin may be inserted into (e.g., screwed into) a hole at the distal end of the center pin (e.g., hole 133, FIG. 1). Assembly may further include bearing inserting the distal end of the outer collet (e.g., outer collet 122) through a central opening (e.g., central opening 152) of the bearing holder, until bearing 126 engages with the bearing holder (e.g., snapably engages). The bearing holder may then be attached to the gage body, so that the center pin extends into the central channel (e.g., central channel 158) of the gage body.

In block 1106, internal portions of a contact disc subassembly may be assembled. In an embodiment, this may include connecting a contact disc (e.g., contact disc 172) with an inner ring (e.g., inner ring 170). In an embodiment, springs (e.g., springs 176) are positioned between holes in the contact disc and complementary holes in the inner ring. An assembly ring (e.g., assembly ring 174) is placed on an opposite side of the contact disc from the springs, and screws (e.g., screws 175) are inserted through complementary holes in the assembly ring, the contact disc, the springs, and the inner ring. A calibration process is then performed, in an embodiment, by adjusting the screws until the contact disc is substantially concentric.

In block 1108, the internal portions of the contact disc subassembly are inserted into the central channel (e.g., central channel 158) of the gage body (e.g., gage body 144), and attached to the sliding member (e.g., sliding member 178) of the contact disc subassembly. In an embodiment, the internal portions of the contact disc subassembly are inserted into the central channel so that a proximal end of the center pin (e.g., center pin 128) extends through the central opening of the contact disc. Complementary holes (e.g., holes 186, 188) of the inner ring (e.g., inner ring 170) and the sliding member are then aligned, and connectors (e.g., connectors 184) are inserted through the holes in the sliding member, through the elongated apertures (e.g., elongated apertures 160) in the gage body (e.g., gage body 144), and into complementary holes in the inner ring. This results in the contact disc subassembly being slidably engaged with the gage body.

In block 1110, a wire may be installed between the bearing and the proximal end of the gage body, and the body top (e.g., body top 146, FIG. 1) may be connected with the proximal end of the gage body. As discussed previously, the body top may include a conductive pad, and the wire may be attached, at one end, to the conductive pad and at an opposite end to the bearing. The wire may be installed inside the central channel (e.g., central channel 158) or along the outside surface (e.g., outside surface 163) of the gage body, in various embodiments.

In block 1112, the indicator subassembly may be assembled. In an embodiment, this includes mechanically and electrically connecting the indicator (e.g., indicator 196) to the indicator housing (e.g., indicator housing 190), and connecting the cover (e.g., cover 198) over the indicator. In addition, a battery holder (e.g., battery holder 192) may be inserted into the distal opening (e.g., distal opening 199) of the indicator housing. During assembly or afterward, a battery (e.g., battery 194) may be inserted into the battery holder, so that a first terminal of the battery contacts the battery holder spring arm, and a second terminal of the battery contacts a conductive pad on the indicator housing, which is in turn electrically coupled to the indicator. A lock pin (e.g., lock pin 195) is then slid through the opposing holes in the indicator housing, in an embodiment.

In block 1114, the indicator subassembly may be attached to the proximal end of the gage body. In an embodiment, this includes sliding the distal opening of the indicator housing over the proximal end of the gage body, so that the lock pin is inserted into complementary locking slots in the proximal end of the gage body. The indicator housing and gage body may then be rotated, with respect to each other, so that the lock pin is moved into indentations in the locking slots. This results in a physical and electrical connection between the indicator subassembly and the gage body.

Assembly of the hole angularity gage may then be considered to be complete. In block 1116, the hole angularity gage may be tested for functionality and calibration, and any rework and or calibration procedures may be performed. The method may then end.

Various embodiments of hole angularity gages, methods of use, and methods of manufacture have been described herein. An embodiment of a hole angularity gage includes a gage body with a proximal end, a distal end, and a central channel between the proximal end and the distal end. The gage also includes a contact disc positioned within the central channel, which includes a central opening defined by an inner edge of the contact disc. The gage also includes a center pin that extends through the central opening of the contact disc, and a hole probe adapted to rotate the center pin from a primary gage axis toward the inner edge of the contact disc. The gage also includes an indicator adapted to activate when the center pin makes physical contact with the contact disc.

Another embodiment of a hole angularity gage includes a hole probe and a circuit, coupled to the hole probe, which has a mechanical switch and an indicator. The switch is adapted to close when the hole probe is rotated by an angle that is greater than a gage setting angle, and the indicator is adapted to activate when the switch is closed.

Another embodiment includes a method for manufacturing a hole angularity gage. The method includes the steps of assembling a hole probe and center pin subassembly with a bearing holder and a gage body. The hole probe and center pin subassembly includes a hole probe, a bearing, and a center pin. Assembling the hole probe and center pin subassembly includes assembling the hole probe and the center pin with the bearing holder, and attaching the bearing holder to the gage body, so that the center pin extends into a central channel of the gage body. The method also includes assembling a contact disc subassembly with a gage body. The contact disc subassembly includes a contact disc, and assembling the contact disc subassembly includes inserting the contact disc into the central channel of the gage body. The method also includes assembling an indicator subassembly that includes an indicator, an indicator housing, and a battery holder. Assembling the indicator subassembly includes attaching the indicator and the battery holder to the indicator subassembly. The method also includes attaching the indicator subassembly to the gage body.

Embodiments of the inventive subject matter may provide certain advantages over traditional hole angularity gages. For example, hole angularity gages of the various embodiments may provide one or more of the following advantages over traditional hole angularity gages: more rapid out-of-tolerance indications or determinations; more compact dimensions, which render them usable in areas with close vertical or ceiling obstructions; and/or an ability to probe holes of having a range of diameters using a single hole probe.

While at least one exemplary embodiment has been presented in the foregoing detailed description, it should be appreciated that a vast number of variations exist. For example, the position of the indicator, with respect to the gage body, may be different from that described previously. For example, an indicator may be positioned on a side of the hole angularity gage or toward a distal end of the hole angularity gage. In addition, different groups of components may be used to establish the hole angularity gage circuit. In addition, a hole angularity gage may be provided that includes multiple, interchangeable hole probes, rather than implementing the collet and tapered pin of the above-described embodiments. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A hole angularity gage comprising:
    a gage body with a proximal end, a distal end, and a central channel between the proximal end and the distal end;
    a contact disc positioned within the central channel, wherein the contact disc includes a central opening defined by an inner edge of the contact disc;
    a center pin that extends through the central opening of the contact disc;
    a tapered pin having a proximal end and a distal end, wherein a diameter of the distal end of the tapered pin is greater than a diameter of the proximal end of the tapered pin;
    a collet portion for accepting the distal end of the tapered pin, the collet portion being adapted to expand to a hole diameter;
    a hole probe adapted to rotate the center pin from a primary gage axis toward the inner edge of the contact disc; and
    an indicator adapted to activate when the center pin makes physical contact with the contact disc.

2. The hole angularity gage of claim 1, further comprising:
    a spherical ball bearing coupled between the hole probe and the center pin; and
    a bearing holder adapted to contain the spherical ball bearing, wherein the bearing holder is coupled to the distal end of the gage body.

3. The hole angularity gage of claim 1, wherein the collet portion comprises:
    an inner collet having a first shaft portion and an inner collet central channel adapted to accept the distal end of the tapered pin; and
    an outer collet having a second shaft portion and an outer collet central channel adapted to accept the inner collet.

4. The hole angularity gage of claim 3, wherein:
    the inner collet includes one or more first slots along the first shaft portion to enable the first shaft portion to expand and contract, in diameter, when the tapered pin is advanced into and retracted out of the inner collet central channel, respectively; and
    wherein the outer collet comprises one or more second slots along the second shaft portion to enable the second shaft portion to expand and contract, in diameter, when a diameter of the inner collet expands and retracts, respectively.

5. The hole angularity gage of claim 1, wherein the collet portion comprises:
    a single collet having a shaft portion and a collet central channel adapted to accept the proximal end of the tapered pin.

6. The hole angularity gage of claim 1, wherein the gage body comprises:
    an elongated aperture having a first end oriented toward the distal end of the gage body and a second end oriented toward the proximal end of the gage body.

7. The hole angularity gage of claim 6, wherein elongated aperture further comprises:
    one or more indentations adapted to lock the sliding member into a position and to restrict sliding of the sliding member along the elongated aperture.

8. The hole angularity gage of claim 6, wherein hole angularity gage further comprises:
    an inner ring positioned within the central channel and coupled to the contact disc; and
    a sliding member coupled through the elongated aperture to the inner ring.

9. The hole angularity gage of claim 8, wherein hole angularity gage further comprises:
    at least one marking on an outside surface of the gage body to indicate a gage setting angle when the sliding member is aligned with the at least one marking.

10. The hole angularity gage of claim 1, wherein the indicator comprises:
   a light emitting diode.

11. The hole angularity gage of claim 1, further comprising:
   a battery housing adapted to accept a button-type battery for providing current to the indicator.

12. A hole angularity gage comprising:
   a hole probe comprising one or more indentations to lock a sliding member into a position, wherein each indentation corresponds to a gage setting angle; and
   a circuit, coupled to the hole probe, which includes a mechanical switch and an indicator, wherein the switch closes when the hole probe is rotated by an angle that is greater than the gage setting angle, and wherein the indicator activates when the switch is closed, wherein the switch further comprises:
      an electrically conductive contact disc that includes a central opening defined by an inner edge of the contact disc; and
      an electrically conductive center pin that extends through the central opening of the contact disc, wherein the hole probe is adapted to rotate the center pin from a primary gage axis toward the inner edge of the contact disc, and wherein the switch is closed when the center pin makes physical contact with the contact disc.

13. The hole angularity gage of claim 12, wherein the circuit further comprises:
   a first conductive path electrically coupled to a first terminal of the switch, wherein the first conductive path includes a wire and a bearing; and
   a second conductive path electrically coupled to a second terminal of the switch, wherein the second conductive path includes a gage body.

14. The hole angularity gage of claim 12, wherein the circuit further comprises:
   a battery adapted to provide current to the indicator.

15. The hole angularity gage of claim 12, wherein the indicator comprises:
   a light emitting diode.

16. A method for manufacturing a hole angularity gage, the method comprising the steps of:
   assembling a hole probe and center pin subassembly with a bearing holder and a gage body, wherein the hole probe and center pin subassembly includes a hole probe, a bearing, and a center pin, and wherein assembling the hole probe and center pin subassembly includes assembling the hole probe and the center pin with the bearing holder, and attaching the bearing holder to the gage body, so that the center pin extends into a central channel of the gage body;
   assembling a contact disc subassembly with a gage body, wherein the contact disc subassembly includes a contact disc, and wherein assembling the contact disc subassembly includes inserting the contact disc into the central channel of the gage body;
   assembling an indicator subassembly that includes an indicator, an indicator housing, and a battery holder, and wherein assembling the indicator subassembly includes attaching the indicator and the battery holder to the indicator subassembly; and
   attaching the indicator subassembly to the gage body.

17. The method of claim 16, wherein the hole probe comprises an outer collet, an inner collet, and a tapered pin, and wherein assembling the hole probe and center pin subassembly further comprises:
   inserting the inner collet into a central channel of the outer collet; and
   inserting the tapered pin into a central channel of the inner collet.

18. The method of claim 16, wherein the contact disc subassembly further comprises an inner ring and a sliding member, and wherein assembling the contact disc subassembly further comprises connecting the contact disc to the inner ring and attaching the sliding member to the inner ring through an elongated aperture of the gage body.

19. The method of claim 16, wherein the indicator subassembly further comprises a lock pin, and wherein attaching the indicator subassembly to the gage body comprises sliding a distal opening of the indicator housing over a proximal end of the gage body, aligning complementary holes on both sides of the indicator housing and the gage body, and sliding the lock pin through the complementary holes.

* * * * *